United States Patent [19]
Beak

[11] Patent Number: 5,588,625
[45] Date of Patent: Dec. 31, 1996

[54] MONITOR STAND ASSEMBLY

[75] Inventor: Soon-ki Beak, Suwon, Rep. of Korea

[73] Assignee: Samsung Electronics Co., Ltd., Kyungki-do, Rep. of Korea

[21] Appl. No.: 515,896

[22] Filed: Aug. 16, 1995

[30] Foreign Application Priority Data

Aug. 16, 1994 [KR] Rep. of Korea .................. 94-20087

[51] Int. Cl.$^6$ .................................................. A47G 29/00
[52] U.S. Cl. .......................................... 248/371; 248/923
[58] Field of Search ................................. 248/917–923, 248/371, 393, 349.1, 183.1; 108/139

[56] References Cited

U.S. PATENT DOCUMENTS

| 5,209,446 | 5/1993 | Kawai | 248/920 |
| 5,398,903 | 3/1995 | Cho | 248/921 |

OTHER PUBLICATIONS

L H. Lowrie and J. R. Thorpe Adjustable Tilt Mechanism For Data–Entry Terminal Jun. 1981 vol. 24 No. 1A pp. 186–187.

Primary Examiner—Ramon O. Ramirez
Assistant Examiner—Willie W. Berry, Jr.
Attorney, Agent, or Firm—Banner & Allegretti, Ltd.

[57] ABSTRACT

An improved monitor stand assembly is disclosed having an upper stand portion with a horizontal locking aperture and first and second guide ribs protrudently formed on the underside of the upper stand portion. The assembly also includes a stand base portion having a coupler bar and rotation controlling ribs and an integral resilient tab. Cooperation of the guide ribs with the controlling ribs and a rib on the resilient tab provides an adjustment and control mechanism which prevents the upper stand portion and stand base portion from dislocating by reducing the resistance to adjustment. The present invention also prevents any deformation of the resilient tab structure or limiting structure thereby enhancing product reliability.

4 Claims, 5 Drawing Sheets

MONITOR STAND ASSEMBLY

BACKGROUND OF THE INVENTION

The present invention relates to an improved monitor stand assembly, and more particularly, to an adjustable monitor stand assembly having structural features to prevent an upper stand portion from dislocating or separating from a stand base portion due to application of an increasing turning force during rotation of the monitor. The monitor stand assembly of the present invention also includes features for readily controlling the angle of rotation of the monitor by providing improved structural configurations of both the upper stand portion onto which a monitor is mounted, and the stand base portion which allows the monitor to rotate in a limited arc angle in both the up-and-down tilt direction and the right-to-left direction.

Generally, a monitor adopted in office automation equipment displays data on its screen to facilitate manipulation of the data by the user. A monitor stand assembly is provided for adjustably moving the monitor in both the up-and-down tilt direction and the right-to-left direction to allow a user to fix the monitor in a proper viewing position. In practical use of such a monitor stand assembly, the turning radius of a monitor is controlled within a limited angle range, and coupling and detaching of the monitor is also to be achieved with a simplified assembly process.

As illustrated in FIGS. 1–4, an example of a conventional monitor stand assembly is provided with an upper stand portion 11 integrally formed with cabinet 10 which houses and shields various electric components and a cathode ray tube (CRT) (not shown). A driving portion 12 is generally centered on upper stand portion 11 and has a spherical surface, concave on top and correspondingly convex on its bottom, to enable positioning of the monitor (not illustrated) by tilting up or down. Driving portion 12 mainly refers to the convex underside of upper stand portion 11. A guide slot 12a is provided through driving portion 12 for controlling the angle of tilt-rotation of upper stand portion 11. At one end of guide slot 12a, a resilient tab 13 of a predetermined elasticity is formed by a pair of slits 13a in upper stand portion 11. Resilient tab 13 thus has one end securely fixed to and integrally formed on upper stand portion 11, and a flexible free end which constitutes one end of guide slot 12a. On the top surface of resilient tab 13 is mounted a reinforcing boss 14 which can move resilient tab 13 up and down so as to allow upper stand 11 portion to be attached more easily to a stand base portion 20. On the bottom surface of resilient tab 13 is protrudently formed a direction controlling pin 15 for controlling the rotation of the monitor from right to left.

A pedestal-like stand base portion 20 is provided in combination with upper stand portion 11, on which a circumferential periphery contact portion 20a is formed. Contact portion 20a is generally circular and defines within it a generally concave surface to matingly engage with the bottom surface of driving portion 12 to slidingly enable upper stand portion 11 to rotate from right to left and tilt up and down thereon.

A fixing bar 21 is protrudently formed at substantially the center of stand base portion 20. Fixing bar 21 is disposed to be inserted into guide slot 12a to securely fix upper stand portion 11 onto stand base portion 20. Beside fixing bar 21, a direction controlling aperture 22 is formed in stand base portion 20 into which direction controlling pin 15 is inserted enabling rotation of the monitor in the right to left direction by a user in order to manipulate it to a proper viewing position.

On the bottom surface of stand base portion 20, a control rib 23 is protrudently formed which provides contact surfaces to direction controlling pin 15 for controlling the angular range of right to left rotational motion of the monitor. One portion of control rib 23 is comprised of a vertical plane or wall, while another portion is comprised of a slope with a predetermined angle of inclination.

The components of monitor stand assembly described above are depicted in cross-section in FIG. 4 in their assembled configuration: with upper stand portion 11 rotated approximately 90° clockwise relative to base portion 20 as shown in FIG. 1.

To assemble the monitor stand assembly, upper stand portion 11 and stand base portion 20 are first arranged to align with each other so that fixing bar 21 of base portion 20 is insertable into guide slot 12a of upper stand portion 11. Fixing bar 21 and guide slot 12a are then coupled to each other so that the spherical bottom surface of driving portion 12 of upper stand portion 11 engages contact portion 20a of stand base portion 20, and upper stand portion 11 is rotated an arc of predetermined degree so that upper stand portion 11 does not dislocate from the stand base portion 20.

Reinforcing boss 14 is moved in the direction of the arrow casing resilient tab 13 to move upwardly, and simultaneously direction controlling pin 15 is inserted into direction controlling aperture 22 and over the sloped portion of control rib 23. Once inserted, when the monitor is rotated in the lateral direction, controlling pin 15 bears against the vertical plane of control rib 23 to provide its rotational range. From a central orientation, the lateral movement of the monitor is limited by controlling pin 15 bearing against the vertical walls of control rib 23 at an angle approximately 45° to the right and an angle approximately 45° to the left. It can be seen that the rotational range of lateral, right-to-left, movement is thus approximately 90°. The up-and-down tilt movement has a range of approximately 15°.

To disassemble the monitor stand assembly, upper stand portion 11 is detached from stand base portion 20 by pulling upwardly on reinforcing boss 14 of resilient tab 13, and simultaneously, in taking the reverse order of coupling upper stand portion 11, direction controlling pin 15 is removed from direction controlling aperture 22 of base stand portion 20 to achieve detachment of upper stand portion 11 from base stand portion 20.

In the configuration of the conventional type of monitor stand assembly as described above, an increasing moment caused by the force of rotating the monitor into a suitable position pushes the resilient tab upward at a right angle. This in turn causes the direction controlling pin to dislocate from the direction controlling aperture in the stand base portion, resulting in loss of control over monitor rotation and positioning.

In addition, breakage of the direction controlling pin in contacting the vertical plane of the control rib due to rotating the monitor disables the control structures and results in loss of effective control over monitor rotation.

Furthermore, it has been found that the upper stand portions of conventional monitor stand assemblies dislocate easily from their base portions thereby diminishing product reliability.

SUMMARY OF THE INVENTION

Therefore, it is an object of the present invention to provide a monitor stand assembly integral with the cabinet of a monitor in which an upper stand portion is easily coupled to its stand base portion and firmly secured thereon so as not to dislocate during rotation of the upper stand portion to adjust the monitor to a user's proper viewing position.

It is another object of the present invention to minimize deformation of a resilient tab due to an increasing moment caused by the force of rotating the monitor into a suitable position thereby ensuring that the weight of the monitor is stabilized in the direction of the center of gravity which enhances the reliability of the product.

To accomplish the above objects of the present invention, there is provided a monitor stand assembly having an upper stand portion onto which a monitor is mounted and a stand base portion onto which the upper stand portion is coupled. The upper stand portion has a resilient tab integrally formed thereon, a reinforcing boss formed on the upper surface of the resilient tab, and a direction controlling pin protrudently formed on the bottom surface of the resilient tab. The stand base portion has a directional controlling aperture formed therein to receive the direction controlling pin enabling the upper stand portion to rotate in both the right-to-left and up-and-down directions. The stand base portion also has a control rib protrudently formed thereon. The improvements to the monitor stand assembly comprise a horizontal locking aperture formed in the upper stand portion which enables monitor movement in the up-and-down tilt direction; first and second downwardly protruding guide ribs formed on the underside of the upper stand portion in diagonally opposed relation to the locking aperture; a coupling bar affixed to and disposed substantially in the center area of the stand base portion to be inserted into the locking aperture to couple the upper stand portion to the stand base portion and to control the angular range of up-and-down tilt movement. The improvements further comprise a resilient tab integrally formed on the stand base portion, the resilient tab having an upward protrusion rib which engages one of the guide ribs of the upper stand portion. Also formed on the stand base portion are first and second rotation control ribs disposed across from each other which respectively contact the first and second guide ribs of the upper stand portion to control the angular limits of rotation of the upper stand portion relative to the base portion in the lateral or right-to-left direction.

These and other features and advantages of the invention may be more completely understood from the following detailed description of the preferred embodiment of the invention with reference to the accompanying drawings.

DETAILED DESCRIPTION OF THE PREFERRED EMBODIMENT

Figure 1:
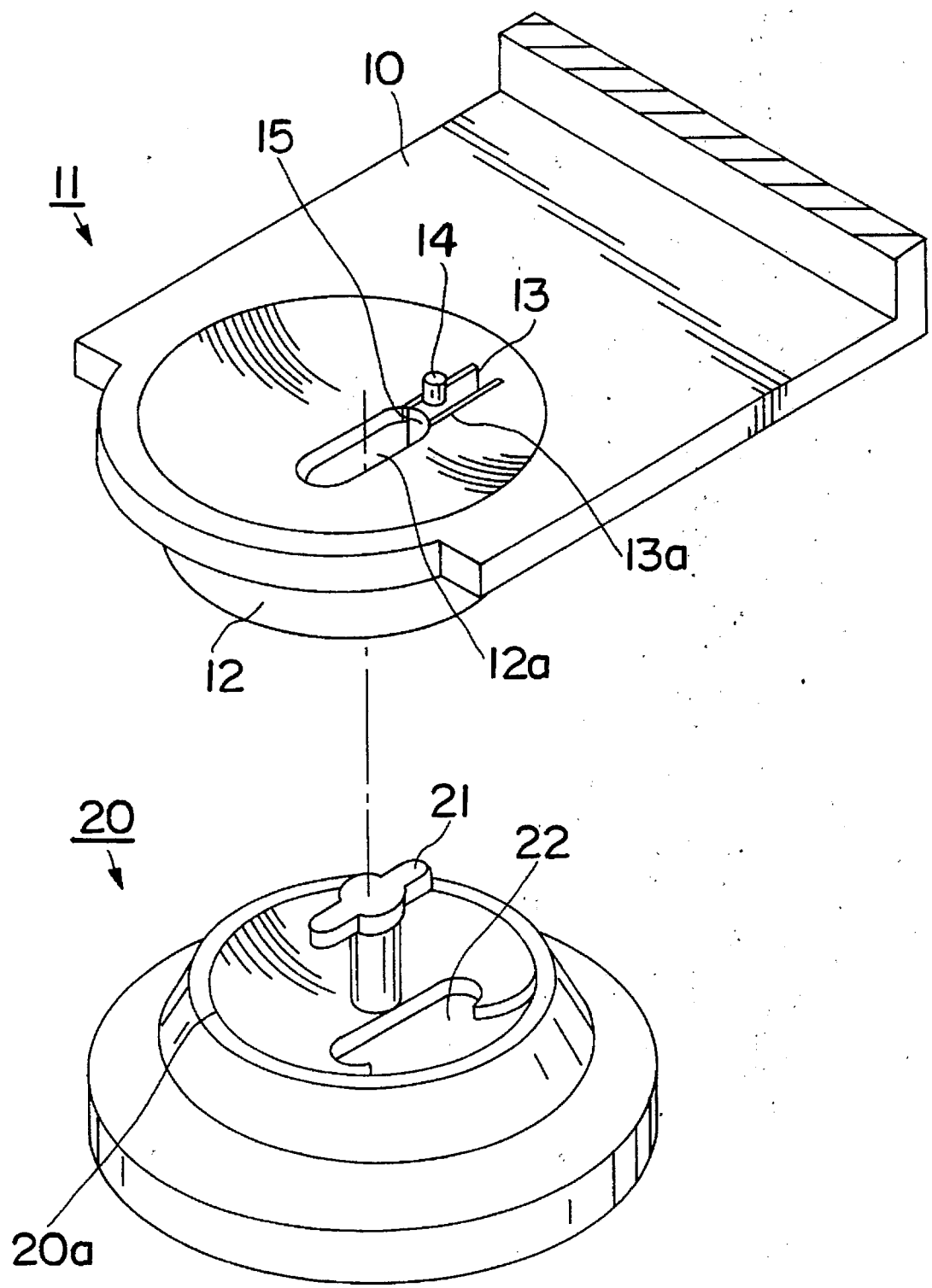
FIG. 1 is an exploded perspective view of a conventional monitor stand assembly.
Figure 2:
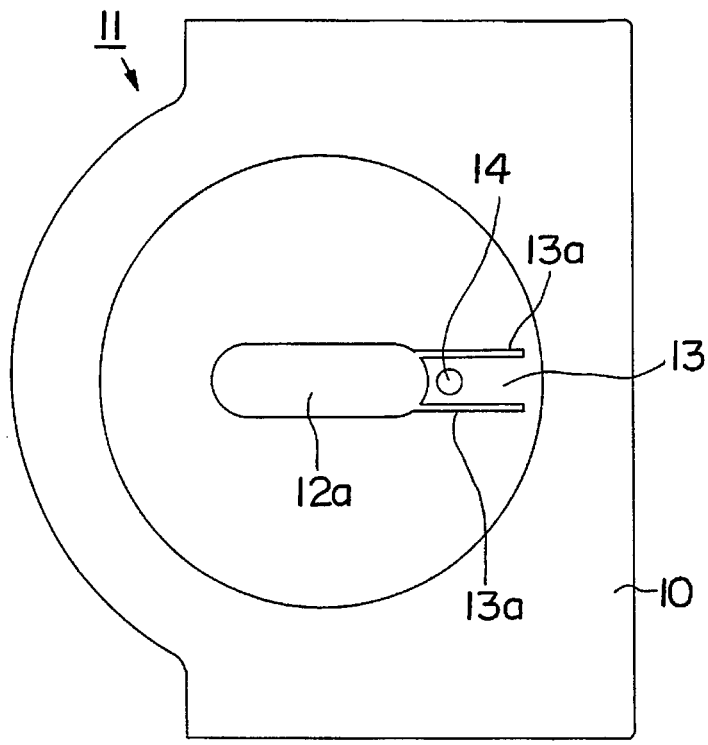
FIG. 2 is a top plan view of the upper stand of the conventional monitor stand assembly of FIG. 1.
Figure 3:
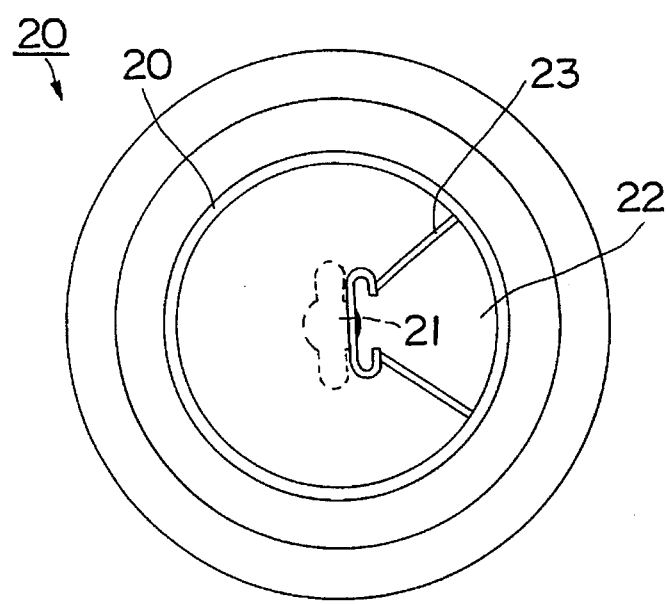
FIG. 3 is a bottom plan view of the stand base of the conventional monitor stand assembly of FIG. 1.
Figure 4:
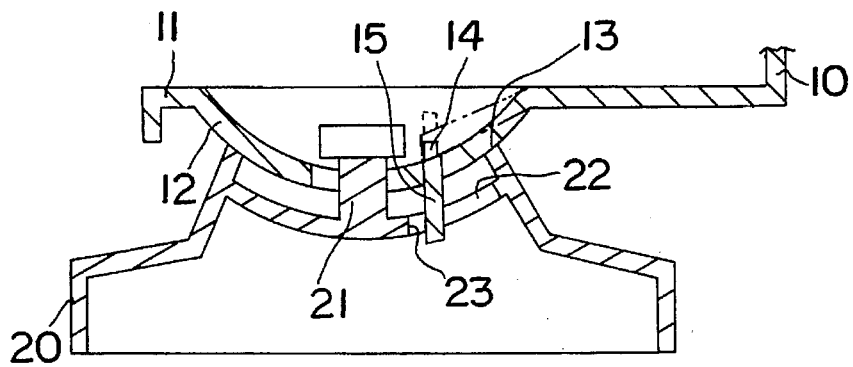
FIG. 4 is a cross-sectional view of the monitor stand assembly of FIG. 1, shown assembled and with the upper stand portion rotated.
Figure 5:
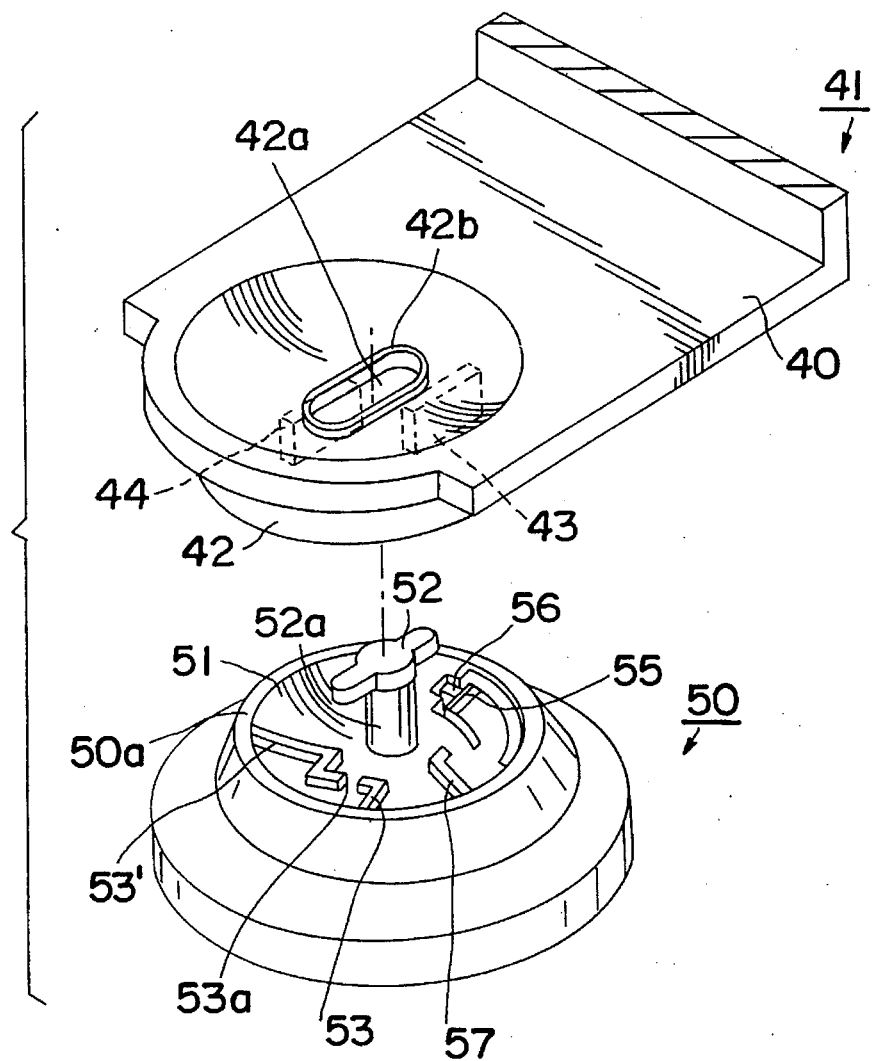
FIG. 5 is an exploded view of a preferred embodiment of the monitor stand assembly of the present invention.
Figure 6A:
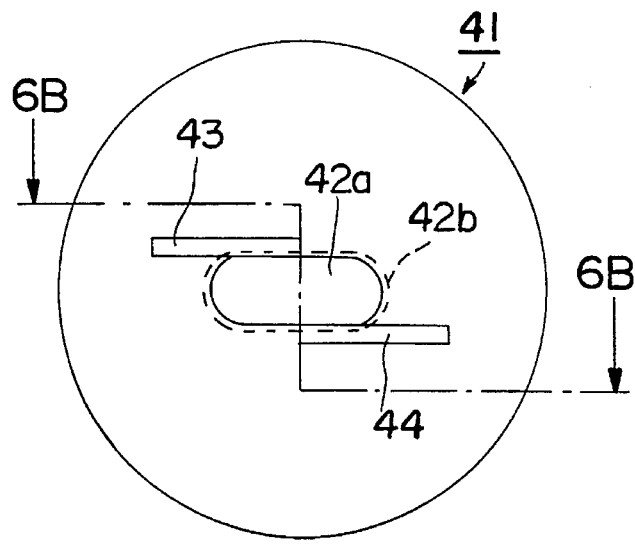
FIG. 6A is a bottom plan view of the upper stand portion of FIG. 5.
Figure 6B:
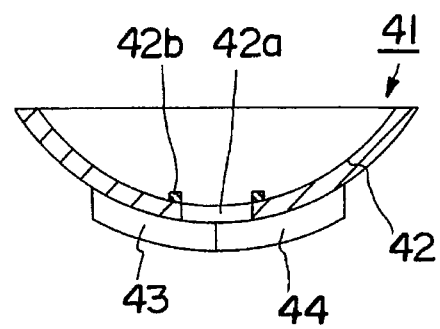
FIG. 6B is a cross-sectional view along line 6B—6B of FIG. 6A.
Figure 7A:
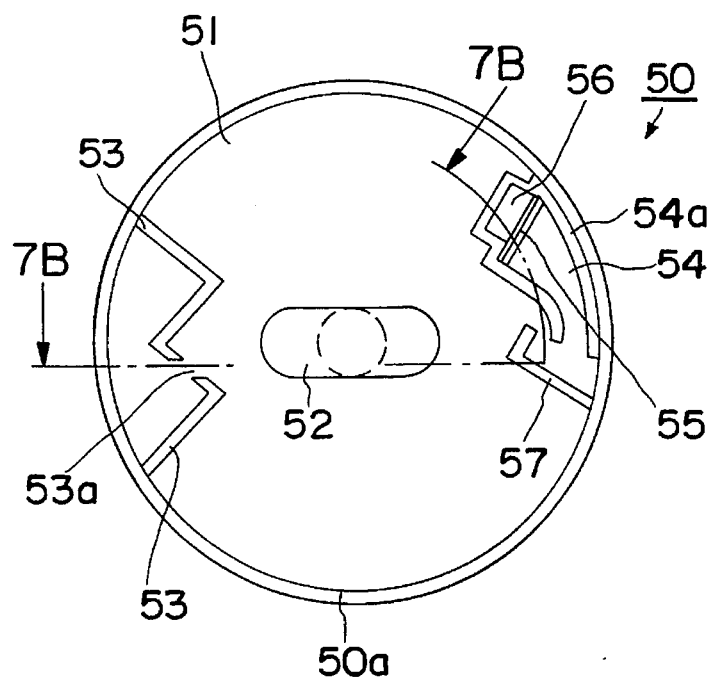
FIG. 7A is a top plan view of the stand base portion of FIG. 5.
Figure 7B:
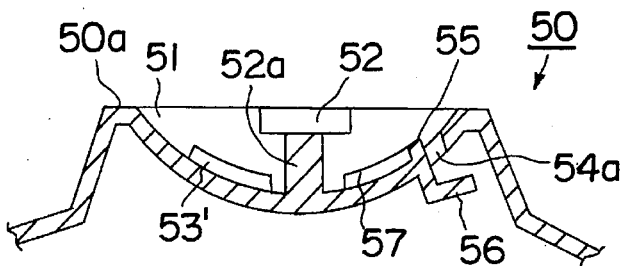
FIG. 7B is a cross-sectional view along line 7B—7B of FIG. 7A.

FIGS. 5–9 illustrate a preferred embodiment of the present invention, in which an upper stand portion 41 is provided having a circumferential periphery integrally formed with a cabinet 40 for housing and shielding a CRT. A driving portion 42 is generally centered on upper stand portion 41 and has a spherical, concavely curved surface on its underside for adjusting the position of a monitor mounted on upper stand portion 41 up or down in a tilting rotation movement. A horizontal locking aperture 42a is integrally formed through driving portion 42 and includes an upwardly protruding slide rib 42b around its periphery for controlling the rotation of driving portion 42 as explained below.

First and second guide ribs 43, 44 of substantially rectangular shape protrude downwardly from the bottom surface of driving portion 42. Guide ribs 43 and 44 are disposed in diagonally opposed relation with respect to the center of horizontal locking aperture 42a. These guide ribs are part of an overall adjustment mechanism which facilitates manipulation of the upper stand portion with respect to the base portion and provides for angular rotation limits in the lateral and vertical tilt directions.

The assembly of the present invention also includes a stand base portion 50 which has a contact portion 50a formed on the circumferential periphery of stand base portion 50 to enable upper stand portion 41 to slidingly rotate thereon in several directions. Contact portion 50a defines therein a supporting area 51 having a concavely curved surface for cooperating with driving portion 42 of upper stand portion 41.

At substantially the center of supporting area 51, a coupler bar 52 projects vertically upward supported on a column 52a and is disposed to securely couple upper stand portion 41 to base portion 50 by extending through locking aperture 42a.

Figures 9A, 9B:
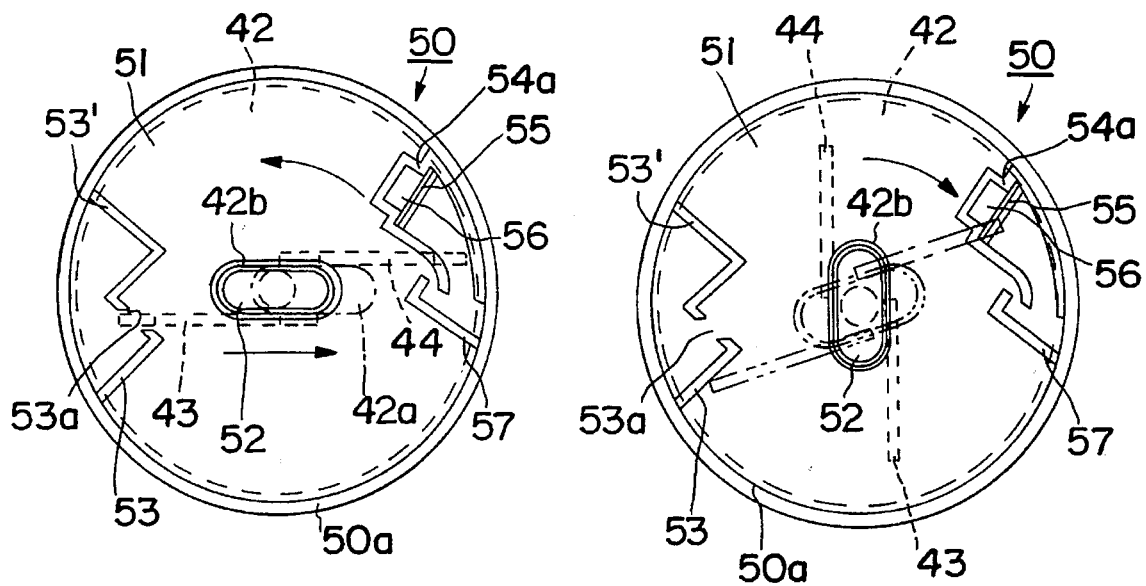
FIGS. 9A and 9B are respective illustrations of assembling and disassembling operations.

Also provided on supporting area 51 are a plurality of rotation control ribs: one set 53 and 53' disposed on one side of coupling bar 52 define an escape groove 53a therebetween. As best seen in FIGS. 9A and 9B, when the stand assembly is assembled, first guide rib 43 of upper stand portion 41 is received in escape groove 53a. Diametrically across from ribs 53 and 53' is a resilient tab 54 which is downwardly movable and is formed by a separating slit 54a. Resilient tab 54 includes an upwardly protrudent rib 55 and an L-shaped downward knob 56. Protrudent rib 55 has a vertical side wall portion and a sloped portion. Adjacent to rib 55 is another rotation control rib 57 so that second guide rib 44 of upper stand portion 41 is received therebetween.

Figure 8:
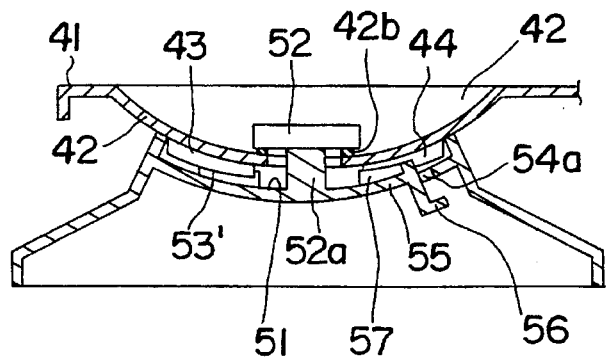
FIG. 8 is a cross-sectional view of the components of FIG. 5, shown assembled and with the upper stand portion rotated.

Referring now to FIGS. 8, 9A and 9B, the preferred embodiment of the present invention will be explained in detail in conjunction with the assembly and operation thereof.

The monitor stand assembly comprises upper stand portion 41 and stand base portion 50 coupled together and adjusted to a suitable viewing position. The preferred assembly is best seen in FIGS. 9A and 9B. To assemble the invention, upper stand portion 41 and stand base portion 50 are first aligned with each other so that coupler bar 52 extends through locking aperture 42a. Thus, the bottom surface of coupler bar 52 is slidingly placed on peripheral slide rib 42b, and simultaneously upper stand portion 41 is safely mounted on stand base 50 so as to allow driving portion 42 to slide relative to contact portion 50a in each and every direction. At this point in the assembly process, first and second guide ribs 43 and 44 are arranged to be inserted respectively into escape groove 53a and between protrudent rib 55 and control rib 57. To release guide ribs 43 and 44, upper stand portion 41 is tilted upward and rib knob 56 is pulled downward and allowing upper stand portion 41 to be rotated counter-clockwise with respect to stand base portion 50, as indicated by the arrow in FIG. 9A, so that coupler bar 52 locks over locking aperture 42a and guide rib 43 is in the angular area limited by rib 57 and rib 53; and guide rib 44 is in the angular area limited by rib 53' and rib 55. FIG. 8 shows the assembled device after this rotation with all of the structures engaged similar to the configuration of guide ribs 43 and 44 shown in broken lines in FIG. 9B.

Referring now to FIGS. 9A and 9B, operation of the stand assembly will now be explained in greater detail.

Once the upper stand portion 41 and stand base portion 50 are assembled as shown in FIGS. 9A and 9B and as described above and first guide rib 43 has been released from escape groove 53a by tilting upper stand portion 41 upward and then pulling rib knob 56 of resilient tab 54 downward which also results in a sliding of second guide rib 44 over protruded rib 55, when the pulling force applied to resilient tab 54 is removed, tab 54 is restored to its original state with its protrudent rib 55 in a blocking position. In this manner, first guide rib 43 is positioned between control rib 57 and rib 53, while second guide rib 44 is positioned between control rib 53' and the vertical plane of protrudent rib 55. These control ribs define the extreme limits of lateral rotation, that is, they are the bearing surfaces for guide ribs 43 and 44.

In this manner, upper stand portion 41 onto which a monitor is mounted is adjusted more easily to a user's proper viewing position since, in contrast to the conventional device in which a controlling pin is consistently bearing against vertical planes of a control rib, there is less resistance to rotation of upper stand portion 41. The lateral rotative angles are approximately 45° to the left of a centered position and approximately 45° to the right. The up-and-down tilting range is between approximately 5° in one direction and 10° in the other direction from a vertically centered position. As can be seen, column 52a bears against the periphery of locking aperture 42a to limit the tilting movement.

In disassembling, upper stand portion 41 is moved so that first guide rib 43 is positioned within escape groove 53a by pulling downward on rib knob 56 of resilient tab 54 and turning upper stand portion 41 clockwise as indicated by the arrow in FIG. 9B so that locking aperture 42a is aligned with coupler bar 52 and upper stand portion 41 is able to be detached.

As explained above, a monitor stand assembly according to the present invention prevents possible dislocation of the upper stand portion from the base portion during rotation. In addition, the present invention prevents any deformation of the resilient tab or controlling pin which had previously been caused by an increased moment due to the force of rotating the monitor into a suitable position. Providing multiple rib contact surfaces and other structural features increases durability and stability of the monitor stand assembly while enhancing product reliability.

The above description is that of a preferred embodiment of the invention. Various alterations and modifications as well as changes can be made without departing from the spirit and broader aspects of the invention as set forth in the appended claims.

I claim:

1. A monitor stand assembly having an upper stand portion for seating a monitor thereon, a stand base portion supporting the upper stand portion, said assembly providing lateral rotation and vertical tilt movement for adjustability of a user's viewing position, the improvement comprising:

the upper stand portion having a horizontal locking aperture formed therein and having first and second guide ribs protrudently disposed in a diagonally opposed relation to one another and said locking aperture; and the stand base portion having a coupler securely fixed in a vertical orientation in a substantially centered area for coupling to said locking aperture and thereby providing vertical tilt movement of the upper stand portion relative to the stand base portion, the stand base portion also including a first control rib located on one side of said coupler and a second control rib located diametrically across said coupler, said second control rib including an upwardly protrudent rib integrally formed on a movable resilient tab, said first and second control ribs configured to cooperate with said first and second guide ribs for controlling the rotational angle of the upper stand portion relative to the stand base portion in a lateral direction.

2. The monitor stand assembly as claimed in claim 1, wherein an escape groove is formed in said first control rib into which said first guide rib is inserted during the procedure of coupling said upper stand portion to said stand base.

3. The monitor stand as claimed in claim 1, wherein said resilient tab includes a protruded rib formed protrudently thereon having one vertical side wall and another slope, whereby said second guide rib is blocked by said protruded rib.

4. The monitor stand as claimed in claim 1, wherein said resilient tab further comprises a rib knob on the bottom surface thereof for easily pulling down said resilient tab, whereby said upper stand portion coupled to said stand base is moved within a limited range of angle in the direction of right or left.

* * * * *